US011163085B2

(12) United States Patent
Gloux et al.

(10) Patent No.: US 11,163,085 B2
(45) Date of Patent: Nov. 2, 2021

(54) APPARATUS FOR ORIENTING AN ELECTROMAGNETIC FIELD SENSOR, AND RELATED RECEIVER UNIT AND METHOD

(71) Applicant: Advanced Hydrocarbon Mapping As, Stavanger (NO)

(72) Inventors: Bernard Gloux, Stavanger (NO); Stefan L. Helwig, Houston, TX (US); William Wood, Hommersak (NO)

(73) Assignee: Advanced Hydrocarbon Mapping AS, Stavanger (NO)

( * ) Notice: Subject to any disclaimer, the term of this patent is extended or adjusted under 35 U.S.C. 154(b) by 56 days.

(21) Appl. No.: 16/305,623

(22) PCT Filed: May 29, 2017

(86) PCT No.: PCT/NO2017/050136
§ 371 (c)(1),
(2) Date: Nov. 29, 2018

(87) PCT Pub. No.: WO2017/209623
PCT Pub. Date: Dec. 7, 2017

(65) Prior Publication Data
US 2020/0064508 A1    Feb. 27, 2020

(30) Foreign Application Priority Data
May 30, 2016  (NO) .................................... 20160918

(51) Int. Cl.
*G01V 3/08*      (2006.01)
*H01Q 1/18*     (2006.01)
*H01Q 9/16*     (2006.01)

(52) U.S. Cl.
CPC .............. *G01V 3/083* (2013.01); *H01Q 1/185* (2013.01); *H01Q 9/16* (2013.01); *G01V 2003/085* (2013.01)

(58) Field of Classification Search
CPC .............. H01Q 1/18–185; G01V 3/083; G01V 2003/084–086
See application file for complete search history.

(56) References Cited

U.S. PATENT DOCUMENTS 3,514,693 A      5/1970  Cagniard
4,630,056 A  * 12/1986  Noguchi ................ H01Q 3/005
                                                            342/359

(Continued)

FOREIGN PATENT DOCUMENTS

EP    0590795 A2    4/1994
EP    1600795 A2   11/2005

(Continued)

*Primary Examiner* — Patrick Assouad
*Assistant Examiner* — Demetrius R Pretlow
(74) *Attorney, Agent, or Firm* — Gable Gotwals

(57) ABSTRACT

There is described apparatus for orienting at least one electromagnetic field sensor, a related receiver unit and method of use. The apparatus has an orientation detector having an output which is dependent upon an orientation of the electromagnetic field sensor, an actuator and a controller which is arranged in communication with the orientation detector and the actuator, the controller being configured to be operable to generate at least one instruction for operating the actuator for moving the electromagnetic field sensor into a predefined orientation, in dependence upon the output from the orientation detector.

11 Claims, 3 Drawing Sheets

(56) References Cited

U.S. PATENT DOCUMENTS

| | | | |
|---|---|---|---|
| 7,116,108 B2 | 10/2006 | Constable | |
| 7,203,599 B1 * | 4/2007 | Strack | G01V 3/083 |
| | | | 324/354 |
| 7,463,206 B1 * | 12/2008 | Kyhle | H01Q 1/18 |
| | | | 343/765 |
| 2005/0077902 A1 * | 4/2005 | MacGregor | G01V 3/12 |
| | | | 324/334 |
| 2006/0129322 A1 | 6/2006 | MacGregor et al. | |
| 2009/0184715 A1 * | 7/2009 | Summerfield | G01V 3/083 |
| | | | 324/334 |
| 2009/0265111 A1 * | 10/2009 | Helwig | G01V 3/083 |
| | | | 702/7 |
| 2009/0315539 A1 * | 12/2009 | Helwig | G01V 3/083 |
| | | | 324/149 |
| 2009/0315563 A1 | 12/2009 | Anthony | |
| 2010/0060286 A1 * | 3/2010 | Summerfield | G01V 3/083 |
| | | | 324/334 |
| 2010/0085055 A1 | 4/2010 | Pavel | |
| 2010/0102820 A1 * | 4/2010 | Martinez | G01V 3/083 |
| | | | 324/334 |
| 2010/0102985 A1 * | 4/2010 | Ridyard | G01V 3/12 |
| | | | 340/852 |
| 2011/0175604 A1 | 7/2011 | David et al. | |
| 2011/0296908 A1 | 12/2011 | Kaare | |
| 2011/0317514 A1 * | 12/2011 | Sudow | G01V 1/3826 |
| | | | 367/16 |
| 2013/0057651 A1 * | 3/2013 | Ueland | H01Q 1/18 |
| | | | 348/46 |
| 2013/0321225 A1 * | 12/2013 | Pettus | H01Q 1/18 |
| | | | 343/765 |
| 2016/0341846 A1 * | 11/2016 | Kang | G01V 3/40 |
| 2017/0261629 A1 * | 9/2017 | Gunnarsson | G01V 1/3817 |
| 2018/0246245 A1 * | 8/2018 | Heelan | G01V 11/002 |
| 2018/0358689 A1 * | 12/2018 | Ke | H01Q 1/185 |
| 2019/0162537 A1 * | 5/2019 | Rasson | G01R 33/02 |

FOREIGN PATENT DOCUMENTS

| | | |
|---|---|---|
| NO | 323889 B1 | 7/2007 |
| WO | 2008008127 A2 | 1/2008 |
| WO | 2010041959 A1 | 4/2010 |

\* cited by examiner

APPARATUS FOR ORIENTING AN ELECTROMAGNETIC FIELD SENSOR, AND RELATED RECEIVER UNIT AND METHOD

CROSS-REFERENCE TO RELATED APPLICATIONS

This United States application is the National Phase of PCT Application No. PCT/NO2017/050136 filed 29 May 2017, which claims priority to Norwegian Patent Application No. 20160918 filed 30 May 2016, each of which is incorporated herein by reference.

TECHNICAL FIELD

The present invention relates in particular to apparatus for orienting an electromagnetic field sensor, a related receiver unit and a method.

BACKGROUND

Surveys of various kinds may be performed for example to investigate the geological subsurface of the Earth. This is can be of interest in order to understand the make-up of the subsurface, and may for example be performed to explore for natural resources such as hydrocarbons. Electromagnetic (EM) surveys may be performed in order to explore for hydrocarbons, and in offshore locations marine surveys may be performed. Such surveys typically involve the detection of components of an electromagnetic field which has interacted with the subsurface. In particular variants such as in a marine controlled source electromagnetic (CSEM) survey, an electromagnetic field may be actively transmitted from a dipole source which is located underwater. Receivers may be deployed on the seabed and may be used to measure the electromagnetic field in response to the transmission from the source by way of one or more electrical dipoles and/or magnetometers. The measured fields may be dependent upon the resistivity or conductivity in the region of the subsurface through which the field propagates and may thus provide information for understanding the subsurface.

In EM surveys, it is normally sought to deploy receivers with electric, magnetic or electromagnetic sensors which have a known orientation within the electromagnetic field. Examples for these sensors can be E-field dipole sensors with electrodes on both dipole ends, a magnetic coil sensor that senses the magnetic field in one direction, a fluxgate sensor that also senses the magnetic field in one direction or any other vector sensor that senses a component of the electromagnetic field.

The vertical component of the EM field can be particularly useful for example in shallow water depths where other components may be less readily measurable due to noise. The length of the dipole in the receiver can be important as the strength of the measured and recorded signals at the receiver is directly proportional to the length. The larger the distance between a pair of electrodes making up the dipole, the stronger the signal. Whilst a long dipole (long distance between electrodes) can be beneficial, practical challenges can exist to meet constraints in the size and weight of the dipole and in the supporting receiver structure for ease of handling of the receiver at sea, from deployment to retrieval.

For a vertical-vertical method of exploration (see for example published Norwegian patent number NO323889 or U.S. Pat. No. 7,337,064), a most important aspect to the signal quality is that the electrical field sensor is vertical. This may be achieved by ensuring that the two electrodes, which make-up the sensor dipole, are correctly positioned with one electrode vertically above the other. For the interpretation of electromagnetic measurements it is generally important to know the electromagnetic field components along a predefined orientation. In principle these orientations can be chosen arbitrarily as long as the components are linearly independent. Often a Cartesian orientation with horizontal X, Y and vertical Z component is chosen.

In arrangements where a sensor is deployed freely in the water or where suspended from a supporting structure and allowed to swing into position under gravity, or where attached to a structure laying on the seabed, water currents, seabed slope and other local conditions can modify the orientation of the sensor, or can prevent the intended orientation from being achieved altogether.

U.S. Pat. No. 7,116,108 describes an electromagnetic receiver with particular focus on detecting the vertical electrical field component Ez. The receiver utilizes a rigid pole with two electrodes attached that form a dipole to measure the vertical electric field component. The pole is attached to the body of the receiver in such a way that it will be oriented vertically if the base of the receiver lands on a horizontal surface. If however the receiver lands on an inclined/sloped seafloor the orientation of the measurement dipole will deviate from true verticality by the angle of the seafloor slope. This leads to a measurement consisting of a mixture of vertical and horizontal field which is generally not desirable in electromagnetic surveying. In principle it may be possible to mathematically correct for the misalignment if the seafloor slope and the perpendicular field components are known. With the described apparatus however the vertical pole is rigid while the horizontal ones are semi-rigid and are allowed to bend down toward the seafloor. Therefore the exact orientation of all three components relative to each other is unknown. In addition correcting the misalignment by mathematical rotation may lead to an increased noise level.

The patent publication WO2010041959 describes a different kind of receiver that aligns an electromagnetic sensing dipole vertically towards gravity by utilizing a pendulum. This can avoid the potential misalignment due to a sloped seabed described in the section above, but water currents may push the sensor out of its desired orientation or lead to oscillations.

At least one aim of the invention is to obviate or at least mitigate one or more difficulties or drawbacks which may be associated with prior art techniques.

SUMMARY OF THE INVENTION

According to a first aspect of the invention, there is provided apparatus for orienting at least one electromagnetic field sensor, the apparatus comprising:

at least one orientation detector having an output which is dependent upon an orientation of the electromagnetic field sensor;

at least one actuator; and at least one controller which is arranged in communication with the orientation detector and the actuator;

the controller being configured to be operable to generate at least one instruction for operating the actuator for moving the electromagnetic field sensor into a predefined orientation, in dependence upon the output from the orientation detector.

Further features relating to the first aspect of the invention are set out in dependent claims in the claims appended hereto.

According to a second aspect of the invention, there is provided a receiver unit configured to be deployed on the seabed in a marine electromagnetic survey or on the ground in land electromagnetic survey, the receiver unit comprising:

at least one electromagnetic field sensor;

at least one orientation detector having an output which is dependent upon an orientation of the electromagnetic field sensor;

at least one actuator;

at least one controller which is arranged in communication with the orientation detector and the actuator, the controller being configured to be operable to generate at least one instruction for operating the actuator for moving the electromagnetic field sensor into a pre-defined orientation, in dependence upon the output from the orientation detector.

Further features relating to the second aspect of the invention are set out in dependent claims in the claims appended hereto.

According to a third aspect of the invention, there is provided a method of performing an electromagnetic survey, the method comprising:

(a) deploying at least one receiver unit as described in relation to the second aspect on the ground or on the seabed;

(b) transmitting an electromagnetic field; and (c) detecting at least one component of the electromagnetic field using the electro-magnetic field sensor;

the electromagnetic field sensor being arranged in a predefined orientation within the electromagnetic field through operation of the actuator to move said sensor into the predefined orientation by at least one instruction from the controller in dependence upon the output of the orientation detector.

Any of the abovementioned first to third aspects of the invention may include further features as described in relation to any other aspect, wherever described herein. Features described in one embodiment may be combined in other embodiments. For example, a selected feature from a first embodiment that is compatible with the arrangement in a second embodiment may be employed, e.g. as an additional, alternative or optional feature, e.g. inserted or exchanged for a similar or like feature, in the second embodiment to perform (in the second embodiment) in the same or corresponding manner as it does in the first embodiment.

Embodiments of the invention are advantageous in various ways as will be apparent from the specification throughout. Embodiments of the invention may be advantageous in that accurate alignment of electrodes can be achieved, which in turn may facilitate high quality data acquisition in electromagnetic surveys. Further, electrodes may be arranged vertically for detecting vertical components of an electromagnetic field, on sloped seabed surfaces and/or in the presence of currents or changes in currents which such forces may otherwise tend to urge the electrodes out of alignment.

DRAWINGS AND DESCRIPTION

There will now be described, by way of example only, embodiments of the invention with reference to the accompanying drawings, in which.

Figure 1:
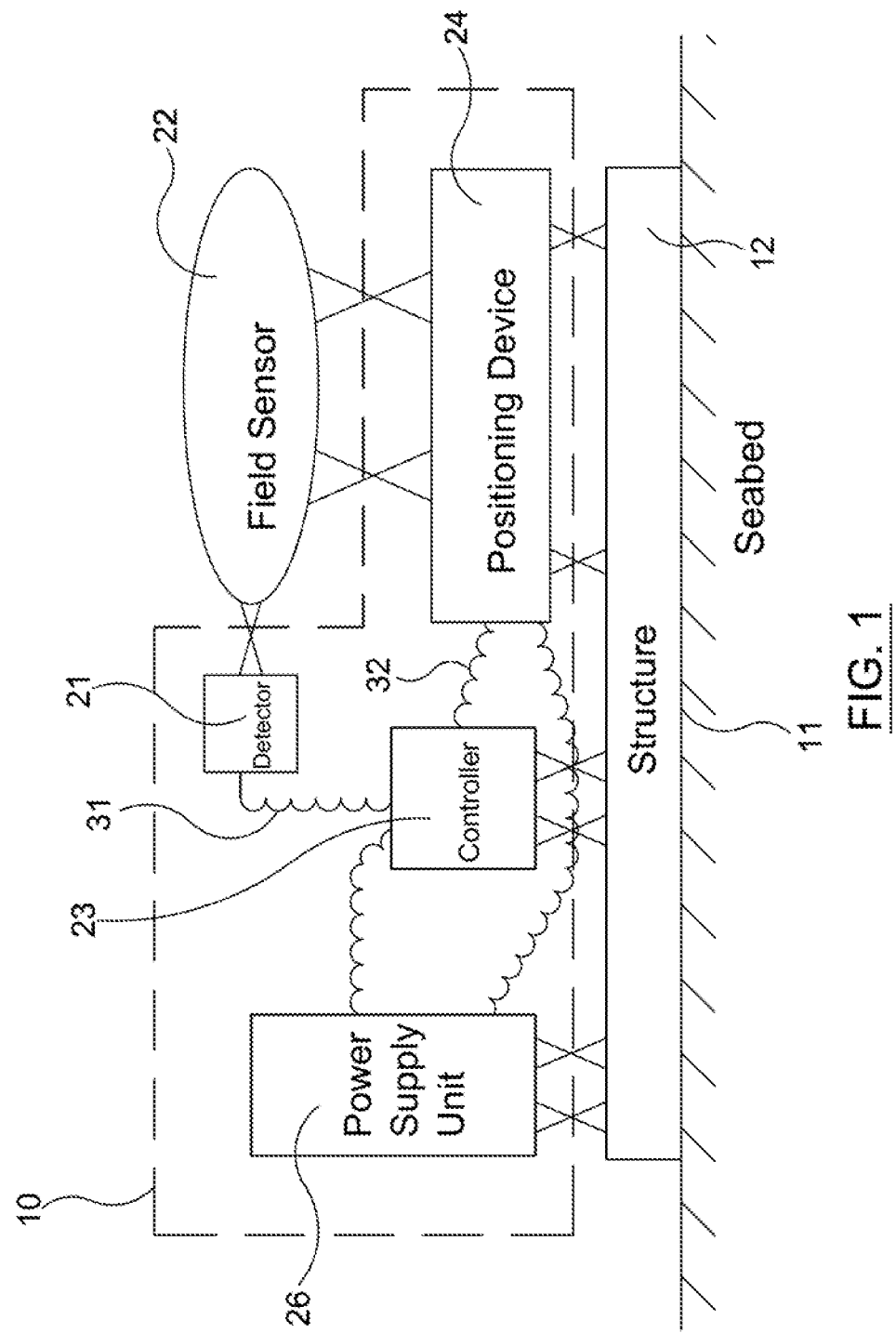
FIG. 1 is a schematic representation of apparatus for orienting an electromagnetic field sensor.

In FIG. 1, there is depicted apparatus 10 for orienting an electromagnetic field sensor. By way of the apparatus 10, the electromagnetic field sensor 22 can be oriented with an axis of the sensor arranged in a pre-defined, desired orientation within an electromagnetic field. The apparatus 10 is interfaced with the ground or seabed 11 by a structure 12.

The apparatus 10 has an orientation detector 21, which is attached to the electromagnetic field sensor 22. The orientation detector 21 is coupled to a controller 23 via a communication cable 31. Data from the orientation detector 21 is communicated (via the cable) to the controller 23, typically on a continuous basis.

The controller 23 is coupled to a positioning device 24 and drives the positioning device 24 via a communication cable. The positioning device 24 is arranged so that it can be actuated and move the electromagnetic field sensor 22 into the predefined orientation. In general, the predetermined orientation can be any desired orientation of the electromagnetic field sensor 22. A power supply unit 26 provides the apparatus 10 with energy.

For use in electromagnetic surveys, the external components are preferably made from non-conductive material.

The orientation detector 21 operates to determine the spatial orientation of the sensor 22 and provides the controller 23 with required data, communicated through the cable 31 therebetween. In other embodiments, data communication may be wireless or take place by other means to replace one or more of the indicated cables.

The controller 23 verifies the data provided by the orientation detector 21, compares them with the pre-defined, desired orientation, and pilots the positioning device 24 to achieve the necessary alignment corrections by issuing instructions as necessary e.g. communicated via connection cable 32, so as to bring the electromagnetic field sensor 22 into the predefined, desired orientation.

Figure 2:
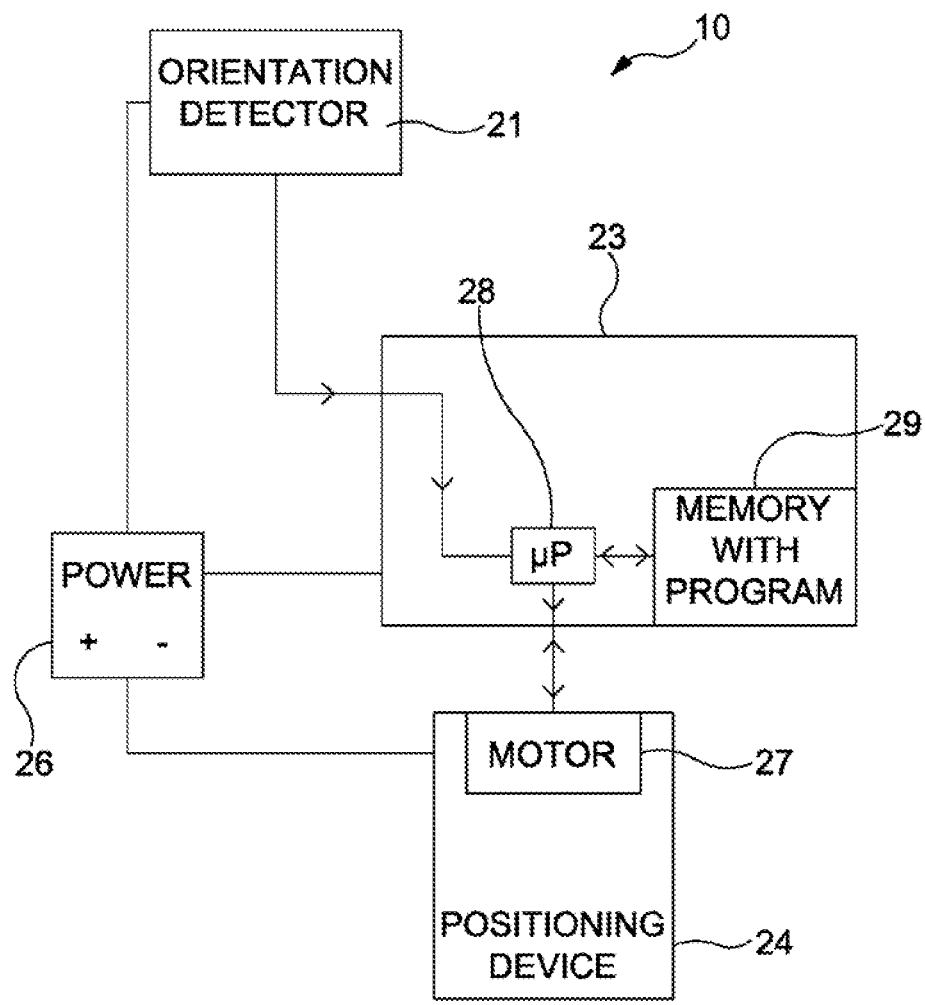
FIG. 2 is a schematic representation showing the active control system for the apparatus of FIG. 1.

With reference to FIG. 2, the functionality of the apparatus 10, and in particular the controller 23, is further described. Data from the orientation detector 21 are fed to the controller 23. The controller 23 is then used to actuate the positioning device 24 as required. The controller 23 includes a processor 28 configured for processing the data from the orientation detector 21, and is arranged to determine whether the electromagnetic field sensor 22 is out of alignment relative to the predefined orientation sought. The controller 23 is therefore programmed, e.g. may have a computer program stored in memory 29 with appropriate instructions which may be executed by the processor 28, for determining the alignment of the electromagnetic field sensor 22 and can then issue a command for controlling the positioning device 24 and achieving the correct orientation. The positioning device 24 includes in this example an actuator in the form of a motor 27 which is mechanically coupled to a rod, arm or other member arranged for positioning the sensor. The positioning device 24 is thus operable by assistance of the motor 27.

In certain embodiments, the positioning device 24 comprises a movable arm and/or rotation device. The positioning device 24 is actuated by the motor 27 based on the command from the controller 23 so as to drive the positioning device 24 to move the sensor 22 into the correct orientation. In practice, the motor 27 may receive the command and then drive the positioning device 24 accordingly. The power unit 26 powers the orientation detector 21, the controller 23, and the positioning device 24.

In this way, the positioning device 24 can be actuated to control the position of the electromagnetic field sensor 22 in the required plane and reach the required x,y,z position to achieve the desired orientation of the sensor, in response to obtained data output from the orientation detector 22.

Although electrical power is indicated in the drawings, the positioning device 24 may be hydraulic or electrically driven, e.g. through hydraulic pumps/motors, electric motors, or some combination thereof.

Figure 3:
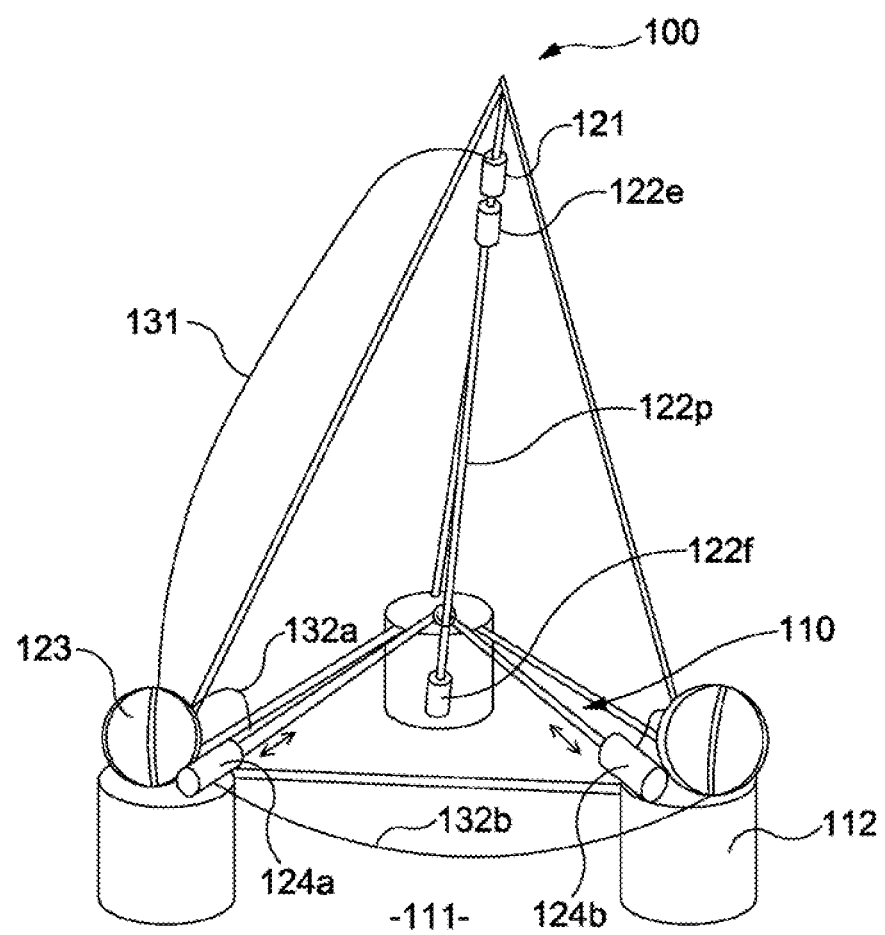
FIG. 3 is a representation showing a receiver arrangement including an apparatus for orienting an electromagnetic field sensor in use in an electromagnetic survey, according to another embodiment.

In FIG. 3, a receiver unit 100 for deployment underwater in an electromagnetic survey is illustrated generally, including apparatus 110 for orienting an electric field sensor 122. The electric field sensor 122 in this example is in the form of an electric dipole. It is sought to arrange the sensor 122 with the dipole axis oriented vertically, in the direction of gravity. The apparatus 110 has features corresponding to those of the embodiments described above, but with the reference numerals of such features incremented by one hundred. In this embodiment, the orientation detector is a gravity-based level sensor 121. Via a cable 131 or other means of communication the orientation information is sent to the controller 123. The controller 123 activates two positioning devices 124a, 124b, each of which in this example comprise an electric motor (an actuator) connected to a threaded rod which in turn is mechanically coupled to a shaft 122p bearing the electric field sensor 122. By operation of the motor, the rod is moved laterally, so as to impart movement to the electric field sensor 122 so that it can be oriented. If the electric field sensor 122 is not in correct alignment, e.g. the dipole axis is not vertical, an instruction in the form of a command is passed from the controller 123 to the motor for operating the positioning devices 124a, 124b to move the electric field sensor 122 into the correct, predefined, desired vertical orientation. The data from the orientation detector 121 is used to determine whether the electric field sensor 122 is aligned, and to establish suitable movement or movements needed to orient the sensor 122 into the desired orientation. The command from the controller 123 for controlling the movement of the positioning devices 124a, 124b is provided accordingly, taking into account the obtained data from the orientation data 121. The controller 123 may operate in this way on a continuous basis, calculating an "error" in alignment of current orientation (according to detection of the orientation detector 121) with respect to the desired orientation and determining a movement for minimizing the error, until the desired orientation is achieved. Therefore, the electric field sensor 122 can be oriented into the desired orientation even if the receiver arrangement lands on the seafloor with the electric field sensor 122 misaligned.

The electric field sensor 122 in this example has first and second electrodes 122e, 122f mounted on a straight, rigid shaft 122p. The sensor 122 is suspended pivotally from a connecting pivot mount on a support frame at an upper end of the shaft 122p, allowing the electric field sensor 122 to be moved pivotally about the mount. The threaded rods of the positioning devices 124a, 124b are arranged to engage with the shaft 122p toward a lower end of the shaft 122p. Through lateral movement of the rods, the positioning devices 124a, 124b can initiate movement of the second electrode 122f relative to the first electrode 122e to arrange the sensor 122 in the desired vertical orientation. Thus, when in the desired orientation, the first and second electrodes are placed one above the other, on a vertical axis.

The receiver unit 100 has a three-legged base for supporting the arrangement upon the seabed in use. The support frame is provided on the base.

In this example, the orientation detector 121 is attached in fixed relation to the sensor 122, being connected to a structure of the sensor, i.e. shaft 122p, at an upper end. Therefore, upon movement of the sensor 122 (through movement of shaft 122p), when being moved into the desired orientation, the orientation detector 121 is moved correspondingly. Being a gravity-based sensor, the output of the orientation detector 121 changes correspondingly with its angle with respect to gravity. Accordingly, the orientation detector 121 is capable of producing data that can be associated with the particular orientation of the electric field sensor 122. It will be appreciated, in general, that any other suitable data-based detection device may be applied to determine or obtain data relating to the orientation of the electric field sensor 122, such as camera detectors or the like.

The positioning devices 124a, 124b may in other variants be actuated in a different manner, for example hydraulically, e.g. the actuator may comprise a hydraulic pump or hydraulic motor, or a hydraulic cylinder and movement arm.

The controller 123 acts to position the positioning devices 124a, 124b until the orientation detector 121 detects that the electric field sensor 122 is oriented with its axis vertically. It can be noted that FIG. 3 also illustrates a connection cable 131 between the orientation detector 121 and the controller 123, and connection cables 132a, 132b for connection between the controller 123 and the actuators of positioning devices 124a, 124b. Through these cables the data output from orientation device can be delivered to the controller and appropriate instructions may be provided to the actuators.

Embodiments of the invention may have features set out in the following.

In one embodiment of the invention, the positioning device may preferably be configured to be operated such that first and second electrodes of a vertical dipole are positioned on a vertical axis.

The apparatus may preferably comprise at least one orientation detector for detecting whether the sensor is positioned along the pre-defined axis within the electromagnetic field.

The apparatus may comprise at least one orientation detector attached to the sensor for determining whether the sensor is positioned in the predefined orientation to detect a particular field component.

The apparatus may further comprise at least one controller fed by the orientation detector for controlling moving parts of the apparatus, or positioning device. The controller may be configured to send an actuation signal to an actuator for actuating the positioning device based on the data from the orientation detector, so as to move the sensor in the pre-defined axis.

In vertical-vertical embodiments of the invention, the orientation detector readings may provide data to a controller in order to move the second electrode relative to the first electrode based on the determination. The controller may be configured to determine whether the first and second electrodes are positioned on a vertical axis. The positioning device may operate to move the second electrode relative to the first electrode if the first and second electrodes are determined not to be suitably positioned, for example if determined to be positioned not on the vertical axis, i.e. if there is some deviation of the first and second electrodes relative to the desired positioning (e.g. vertical).

Thus, in embodiments of the invention two electrodes (sensing elements) may be actively positioned to form a dipole in a preferred orientation.

In a preferred embodiment, the electromagnetic field sensor may have one electrode positioned on top of another one when in the desired orientation. The orientation detector may be mounted upon the electromagnetic field sensor. Thus, the orientation detector can be movable together with the sensor.

Also it should be noted that it might be beneficial to actively position a magnetometer (an electromagnetic field sensor) in a preferred direction, by means of the apparatus described above.

In certain embodiments, the controller may be configured to control valves to achieve the positioning of the sensor with hydraulic actuation.

Various modifications and improvements may be made without departing from the scope of the invention herein described.

The invention claimed is:

1. Apparatus for orienting at least one electromagnetic field sensor of a receiver unit configured to be deployed on the seabed in a marine electromagnetic survey or on the ground in land electromagnetic survey, the apparatus comprising:
   at least one orientation detector having an output which is dependent upon an orientation of the at least one electromagnetic field sensor, the at least one orientation detector and the at least one electromagnetic field sensor being mounted on a shaft suspended pivotably from an upper end of the apparatus;
   at least one positioning device comprising at least one rod being located above a lower end of the shaft and configured to move laterally; each of the at least one rod comprising an actuator;
   at least one controller which is arranged in communication with the at least one orientation detector and the at least one rod actuator;
   the at least one controller being configured to be operable to generate at least one instruction for operating the positioning device to laterally move the at least one rod against the shaft and the at least one electromagnetic field sensor into a predefined orientation within an electro-magnetic field, in dependence upon the output from the at least one orientation detector.

2. Apparatus as claimed in claim 1, wherein the at least one rod actuator comprises a motor.

3. Apparatus as claimed in claim 1, being operable underwater.

4. Apparatus as claimed in claim 1, wherein the at least one electromagnetic field sensor comprises an electric dipole.

5. Apparatus as claimed in claim 4, wherein the at least one actuator is configured to operate to move the electric dipole having an axis such that the dipole axis is vertical.

6. Apparatus as claimed in claim 1, having an exterior which is electrically non-conductive.

7. Apparatus as claimed in claim 1, wherein the at least one electromagnetic sensor comprises at least two sensing elements and, in the predefined orientation within an electromagnetic field, the two sensing elements are aligned on an axis having a predefined, desired orientation.

8. Apparatus as claimed in claim 1, wherein the at least one electromagnetic field sensor is configured for detecting either or both of a vertical field component and a horizontal field component of an electromagnetic field.

9. Apparatus as claimed in claim 1, further comprising a support structure for coupling the at least one electromagnetic field sensor thereto for supporting the at least one electromagnetic field sensor.

10. Apparatus as claimed in claim 9, wherein the at least one positioning device being connected between the support structure and the at least one electromagnetic field sensor for moving the shaft and the at least one electromagnetic field sensor relative to the support structure for arranging the at least one electromagnetic field sensor in the predefined orientation within an electro-magnetic field.

11. A method of performing an electromagnetic survey, the method comprising:
   (a) deploying at least one receiver unit on the ground or on a seabed;
   (b) transmitting an electromagnetic field; and
   (c) detecting at least one component of the electromagnetic field using an electromagnetic field sensor;
   the electromagnetic field sensor being mounted on a shaft suspended pivotably from an upper end of the apparatus and arranged in a predefined orientation within an electromagnetic field through operation of at least one actuator to move a rod laterally against said shaft and thus moving the sensor into the predefined orientation within an electro-magnetic field by at least one instruction from a controller in dependence upon output of an orientation detector.

* * * * *